United States Patent [19]
Sherman

[11] 3,856,571
[45] Dec. 24, 1974

[54] CONTACT LENS HOLDER AND STORAGE CONTAINER USEFUL IN A METHOD FOR CLEANING CONTACT LENSES

[76] Inventor: Guy J. Sherman, 504 Burning Tree Ln., Naperville, Ill. 60540

[22] Filed: Jan. 22, 1973

[21] Appl. No.: 325,254

[52] U.S. Cl.................... 134/34, 134/24, 134/137, 141/113, 206/5.1
[51] Int. Cl........................ A45c 11/04, B08b 3/02
[58] Field of Search............ 134/34, 24, 25 A, 137, 134/143; 206/5 A, 5.1; 141/113, 351, 356; 132/79 R, 80 R, 81

[56] References Cited
UNITED STATES PATENTS

| | | | |
|---|---|---|---|
| 2,940,589 | 6/1960 | Silverman | 206/5 A |
| 3,089,500 | 5/1963 | Stalcup | 206/5 A X |
| 3,113,579 | 12/1963 | Willis | 206/5 A X |
| 3,150,406 | 9/1964 | Obitts | 206/5 A X |
| 3,394,717 | 7/1968 | Hollinger | 134/137 |
| 3,460,552 | 8/1969 | Sturgeon | 134/143 X |
| 3,473,886 | 10/1969 | Leeds | 206/5 A X |
| 3,640,294 | 2/1972 | Piccolo | 206/5 A X |

*Primary Examiner*—S. Leon Bashore
*Assistant Examiner*—Richard V. Fisher
*Attorney, Agent, or Firm*—Wegner, Stellman, McCord, Wiles & Wood

[57] ABSTRACT

A contact lens holder, useful in a method of cleaning contact lenses, in which the holder has two capped receptacles for receiving and holding the lens, with an opening extending upwardly into the holder from the lower surface thereof for the purpose of receiving the nozzle of a cleaning and storage solution aerosol container so that the lenses may be sprayed with solution while they are in the holder itself. There is provided a storage container that receives the holder during storage which may be filled with storage fluid either before or after placement of the holder with the lenses therein inside the storage container. After storage the holder with the lenses therein may be removed and the lenses washed with them still inside the holder to minimize the likelihood of loss and/or breakage as well as reducing the application of undesirable foreign matter to the lenses themselves, eliminating any handling of the lenses.

10 Claims, 4 Drawing Figures

PATENTED DEC 24 1974 3,856,571
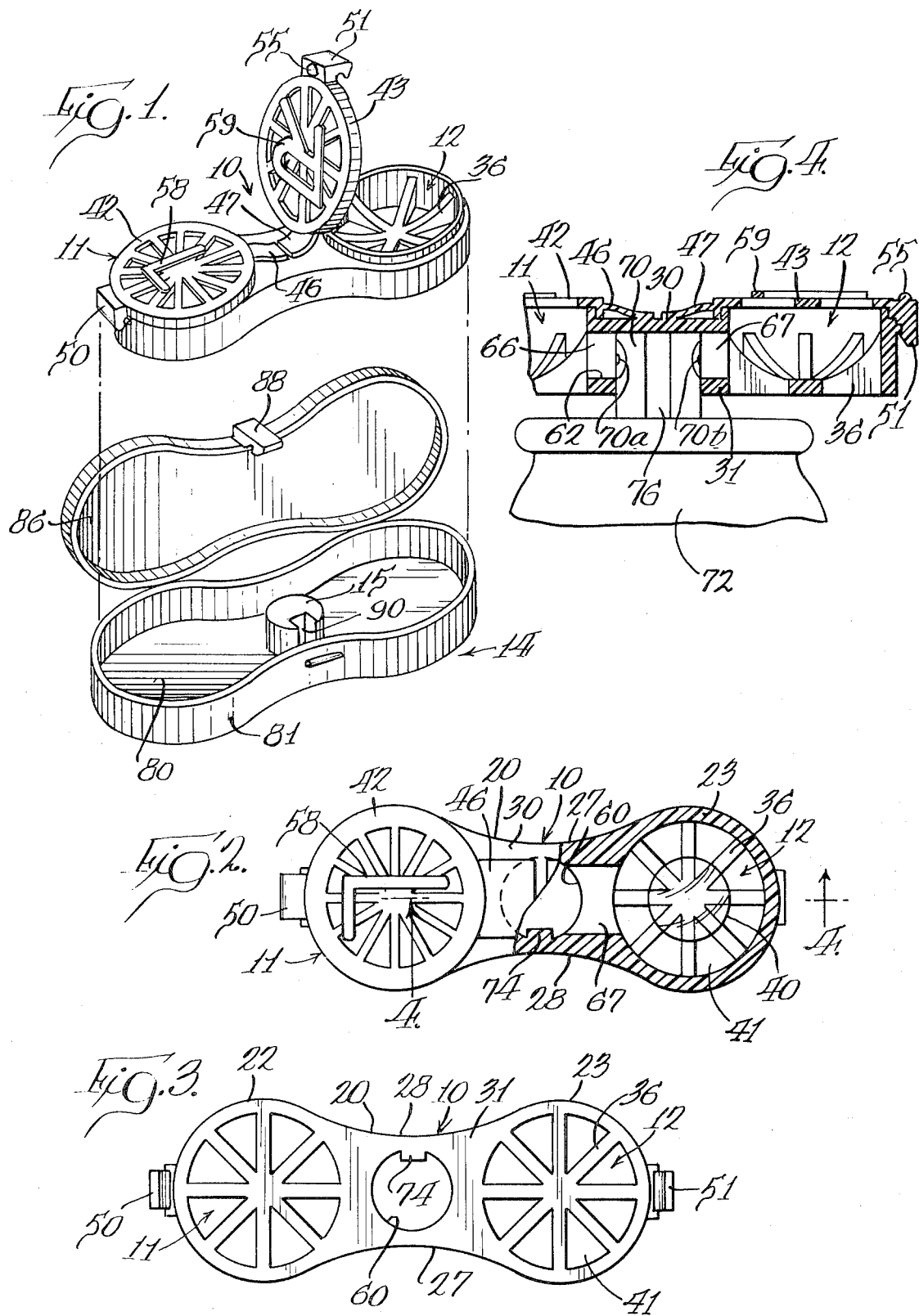

CONTACT LENS HOLDER AND STORAGE CONTAINER USEFUL IN A METHOD FOR CLEANING CONTACT LENSES

BACKGROUND OF THE INVENTION

In the care and storage of contact lenses, it is desirable to cleanse the lenses before storage by bathing them in a cleaning solution and then storing them in a solution which may continue the cleansing action and also maintains the lenses hydrated. Most of the prior art devices require the lenses to have a cleaning solution applied outside the lens holder, increasing the likelihood of loss and also making cleansing more difficult and increasing the possibility of lens scratching and warpage. These prior art devices have compartments for receiving the lenses and are generally sealed so that they hold the storage solution within the container. After storage, the lenses are manually removed from the container, rinsed and a wetting solution is applied prior to insertion of the lenses in the eyes.

It is the primary object of the present invention to eliminate these prior art problems.

SUMMARY OF THE PRESENT INVENTION

According to the present invention a lens holding device and storage container combination is provided that permits the user to clean, store and thereafter rinse the lenses without any manual manipulation, minimizing the problem of lens loss and also minimizing the possibility of any foreign matter being applied to the lens as a result of manual manipulation. Toward this end the lens holders are provided with side-by-side spaced receptacles having snap-on caps that are pervious to liquids. The receptacles are formed with spaced radial concave partitions to facilitate the manual placement and removal of the lens from the receptacle. Extending upwardly from the bottom of the lens holder is a circular opening that freely communicates with the interior of both lens receptacles in the holder.

This opening receives the nozzle of a cleaning and storage solution container so that the lenses may be sprayed with the appropriate solution or foam while in the holder itself.

Thereafter, the nozzle is removed from the opening in the bottom of the holder and the holder is rinsed and placed within a storage container that also receives storage fluid or foam. A projection extends upwardly from the bottom of the storage container locating the holder and also serves the purpose of reducing the interior volume of the storage container so that a lesser amount of solution is required to immerse the lens during storage.

The lens holder is pervious on both its top and bottom surfaces to the solution or foam within the storage container.

After storage the lens holder is removed and the entire holder washed to remove the storage solution, or foam, from the lens while the lenses still remain within the holder, eliminating a serious problem of washing the lenses while outside the holder.

A wetting solution is then applied to the lenses and they are placed on the eyes.

BRIEF DESCRIPTION OF THE DRAWINGS

FIG. 1 is an exploded view of the lens holder illustrated above the storage container shown in its open position;

FIG. 2 is a plan view partly in section of the lens holder;

FIG. 3 is a bottom view of the lens holder, and

FIG. 4 is a fragmentary section of the lens holder shown cooperating with the cleaning and storage solution aerosol container.

DETAILED DESCRIPTION OF THE PREFERRED EMBODIMENT

Referring to the drawings, and particularly to FIGS. 1–3, a lens holder 10 having receptacles 11 and 12 for the left and right lens, respectively, is insertable during storage into a similarly shaped storage container 14 having a projection 15 for holding the lens holder 10 in position.

As seen in FIGS. 2 and 3, the lens holder 10 includes a housing 20 having left and right circular side portions 22 and 23 interconnected by concave arcuate central side wall portions 27 and 28. Integrally molded with the side walls are a top wall 30 and a bottom wall 31 shown in FIG. 3.

Each of the circular side wall portions 22 and 23 has vertically disposed radially extending arcuate segments 36 that define the receptacles 11 and 12 for the lenses as illustrated at 40 in FIG. 2.

As may be seen in FIG. 3, a bottom view, the partitions or arcuate segments 36 have openings 41 therebetween so that the receptacles freely communicate with the exterior of the holder 10 in a manner so that the storage solution within the container 14 may readily immerse the lenses 40 in the receptacles 11 and 12.

As seen in FIGS. 1, 2 and 4, the receptacles 11 and 12 have caps 42 and 43 connected by straps at 46 and 47 to the top housing wall 30.

For the purpose of firmly holding the caps 42 and 43 to the housing 20, integrally formed clasps 50 and 51 are provided, with the clasp 51 having a projection 55 extending upwardly therefrom for the purpose of user identification of the right lens. Moreover to assist identification of the right and left lens, raised letters 58 and 59 are provided on the caps 42 and 43, respectively.

As described above, the lenses within the receptacles 11 and 12 are sprayed with storage, or cleansing solution, or foam, while in the receptacles to minimize manual manipulation. Toward this end, and as seen in FIGS. 2 and 3, a circular opening 60 extends upwardly from the bottom wall 31 centrally thereof and ends adjacent the bottom 62 of the top wall as shown in FIG. 4. This opening communicates freely with the receptacles 11 and 12 through longitudinally extending apertures 66 and 67.

To assist in locating push-button nozzle 70 of aerosol storage solution container 72 with respect to the receptacles 11 and 12, a projection 74 is provided on the one side of opening 60. This projection cooperates with recess 76 in the nozzle push-button 70. Nozzle 70 has diametrically opposed nozzle heads 70a and 70b. With the nozzle push-button in the position as shown in FIG. 4, nozzle 70 will spray the lenses in both receptacles 11 and 12 by user depression on the top wall 30 of the housing 20.

One of the important features of the present invention is that the aerosol 72, rather than containing the conventional storage or cleaning liquid, contains a foaming mixture that more readily breaks down the foreign matter on the lenses 40 and quickly turns into a non-viscous antiseptic and/or germicidal solution for proper over-night storage.

After application of the foam from the aerosol container 72, the holder and lenses therein are rinsed in water either with or without the removal of nozzle button 70. The lens holder 10 is then inserted into the storage container 14 for storage in spray that may be applied directly into the container.

The storage container 14 is hourglass in configuration, having bottom and side walls 80 and 81. A lid 86 is provided along with a clasp 88 for the purpose of closure for over-night storage of the lenses.

For the purpose of maintaining the holder 10 in position within the container, the post 15 is provided fixed to the bottom wall 80 of the container centrally thereof. In a similar fashion to nozzle 70, the projection 15 has a slot 90 that receives the projection 74. The projection 15 also serves the purpose of occupying a volume within the inside of the container 14 that would otherwise have to be occupied by storage solution or foam.

After storage the holder 10 is removed from the storage container 14 and the lenses 40 are rinsed with water while in the receptacles 11 and 12, reducing the likelihood of lens loss or applying any foreign matter to the lens during washing.

Thereafter a suitable wetting agent is applied to the lens and the lenses are placed on the eyes.

I claim:

1. A method of treating a pair of lenses including the steps of: holding the lenses in juxtaposed spaced relationship at the outer ends of oppositely directed passages; providing a container of pressurized lens treating solution provided with nozzle means having oppositely directly spray outlets; disposing said nozzle between the inner ends of said passages; and manipulating the nozzle means to concurrently spray treating solution through said passages for concurrently treating both lenses with said treating solution.

2. A method of cleaning and storing contact lenses in a holder and storage container without the normal manipulation of the lenses, wherein the holder has pervious receptacles for securing lenses, and an opening between the receptacles, the storage container being constructed to secure the holder and to contain storage or cleaning solution therein, the method steps comprising; placing the lenses in the receptacles, inserting the nozzle of a cleaning and storage solution container into the opening, depressing the nozzle to direct cleaning and storage solution into the receptacles, placing the holder with the lenses therein in the container, spraying or otherwise filling the container with storage or cleaning solution, removing the holder from the container and washing the lenses, while in the receptacles.

3. A holder for contact lenses, comprising: housing means defining first and second spaced receptacles with each of the receptacles being adapted to hold a lens; means providing access to each of said receptacles for insertion and removal of a lens; means on said housing defining a recess for receiving and aligning a nozzle adapted to spray pressurized lens cleaning solution laterally from the nozzle as an incident of depression of the nozzle; and means on the housing defining flow passages extending between said recess and each of the receptacles, said passages being disposed to direct spray from said recess into each of the receptacles and against lenses held therein when the nozzle is aligned by said recess means.

4. The holder of claim 3 wherein said recess is in the bottom of the housing between the receptacles.

5. A contact lens treating structure comprising: housing means defining first and second spaced receptacles with each of the receptacles being adapted to hold a lens; means providing access to each of said receptacles for insertion and removal of a lens; means on said housing defining a recess for receiving and aligning a nozzle adapted to spray pressurized lens cleaning solution laterally from the nozzle as an incident of depression of the nozzle; means on the housing defining flow passages extending between said recess and each of the receptacles, said passages being disposed to direct spray from said recess into each of the receptacles and against lenses held therein when the nozzle is aligned by said recess means; and a container of pressurized lens treating solution having an upwardly projecting pushbutton nozzle, said nozzle being received in said recess.

6. The contact lens treating structure as defined in claim 5 wherein said recess has a projection for aligning the nozzle with respect to each of said flow passages and the receptacles, and said nozzle pushbutton has slot means for receiving the projection.

7. The contact lens treating structure as defined in claim 5 wherein said nozzle has a pair of spray outlets, and including means on said housing for locating the nozzle so that it directs solution simultaneously from said spray outlets into both the first and the second receptacles.

8. The contact lens treating structure as defined in claim 7 wherein said locating means includes projections adjacent said opening.

9. A contact lens holder and storage container combination, comprising: a contact lens holder having an intermediate portion and receptacles outwardly of said intermediate portion for separately securing and holding contact lenses, said receptacles being freely pervious to cleaning or storage solutions and the intermediate portion of said contact lens holder having intersecting passages communicating with said receptacles and opening outwardly of said holder, a storage container for said contact lens holder conforming in configuration to said holder and being just enough larger than said holder to receive the same therein with a minimal of clearance so as to reduce to a minimum the space available for solution, said storage container having a lid for closing the same so as to retain cleaning or storing solution therein, said lens holder, when the lid of said container is open, being freely removable from and totally dissociable from said container for further treatment of lenses contained in said holder as by rinsing under a faucet.

10. A contact lens holder and storage container combination as defined in claim 9 wherein one of the intersecting passages in the intermediate portion of said holder is a downwardly opening cylindrical recess, and said storage container has an upwardly projecting cylindrical locator receivable in the cylindrical recess in said holder.

* * * * *